United States Patent
Assarpour (10) Patent No.: US 8,861,334 B2
(45) Date of Patent: Oct. 14, 2014

(54) METHOD AND APPARATUS FOR LOSSLESS LINK RECOVERY BETWEEN TWO DEVICES INTERCONNECTED VIA MULTI LINK TRUNK/LINK AGGREGATION GROUP (MLT/LAG)

(75) Inventor: Hamid Assarpour, Arlington, MA (US)

(73) Assignee: Avaya Inc., Basking Ridge, NJ (US)

( * ) Notice: Subject to any disclaimer, the term of this patent is extended or adjusted under 35 U.S.C. 154(b) by 443 days.

(21) Appl. No.: 13/159,792

(22) Filed: Jun. 14, 2011

(65) Prior Publication Data

US 2012/0320737 A1 Dec. 20, 2012

(51) Int. Cl.
- *G01R 31/08* (2006.01)
- *H04L 12/709* (2013.01)
- *H04L 12/703* (2013.01)
- *H04L 12/26* (2006.01)
- *H04J 3/14* (2006.01)

(52) U.S. Cl.
CPC .......... *H04L 43/0817* (2013.01); *H04L 45/245* (2013.01); *H04L 45/28* (2013.01); *Y02B 60/33* (2013.01)
USPC .......................................... 370/218; 370/225

(58) Field of Classification Search
None
See application file for complete search history.

(56) References Cited

U.S. PATENT DOCUMENTS

| 8,213,300 B1* | 7/2012 | Osswald et al. ............... 370/218 |
| 2007/0201357 A1* | 8/2007 | Smethurst et al. ............ 370/229 |
| 2008/0279106 A1* | 11/2008 | Goodfellow et al. ......... 370/238 |

\* cited by examiner

*Primary Examiner* — Ayaz Sheikh
*Assistant Examiner* — Sori Aga
(74) *Attorney, Agent, or Firm* — Anderson Gorecki & Rouille LLP (57) ABSTRACT

A method, apparatus and computer readable medium for maintaining two variables per port member of a network device which is part of a Split Multi Link Trunk/Link Aggregation Group (SMLT/LAG) is presented. A first variable comprising a link status variable reflecting a link status, and a second variable comprising a forwarding status variable reflecting a forwarding status of a forwarding plane with respect to the port are provided, the link status variable and the forwarding status variable in a first state when the port is operating properly. A failure related to the port is detected. The link status variable is set to a second state, and the forwarding status variable is set to a second state.

20 Claims, 4 Drawing Sheets

METHOD AND APPARATUS FOR LOSSLESS LINK RECOVERY BETWEEN TWO DEVICES INTERCONNECTED VIA MULTI LINK TRUNK/LINK AGGREGATION GROUP (MLT/LAG)

BACKGROUND

Data communication networks may include various computers, servers, nodes, routers, switches, hubs, proxies, and other devices coupled to and configured to pass data to one another. These devices are referred to herein as "network elements," and may provide a variety of network resources on a network. Data is communicated through data communication networks by passing protocol data units (such as packets, cells, frames, or segments) between the network elements over communication links on the network. A particular protocol data unit may be handled by multiple network elements and cross multiple communication links as it travels between its source and its destination over the network. Hosts such as computers, telephones, cellular telephones, Personal Digital Assistants, and other types of consumer electronics connect to and transmit/receive data over the communication network and, hence, are users of the communication services offered by the communication network.

Network elements are typically implemented to have a control plane that controls operation of the network element and a data plane that handles traffic flowing through the network. The data plane typically will have a collection of line cards having ports that connect to links on the network. Data is received at a particular port, switched within the data plane, and output at one or more other ports onto other links on the network. To enable the data to be handled quickly, the data plane is typically implemented in hardware so that all of the decisions as to how to handle the data are performed using hardware lookups, etc.

Two or more links may be grouped to form a Multi-Link Trunk (MLT). MLT is a method of link aggregation that allows multiple point-to-point links to be aggregated together in order to provide a single logical trunk. An MLT provides the combined bandwidth of the multiple links, as well as the physical layer protection against failure of any single link. Each MLT is assigned a MLT group ID (MLT-ID), which is a global value within the cluster and unique across the cluster nodes. An MLT with all its port members only on one node is referred to as a normal MLT group. An MLT group where its port members are on two or more nodes is referred to as a Split MLT or SMLT group. Link Aggregation Group (LAG) uses multiple network cables/ports in parallel to increase the link speed beyond the limits of any one single cable or port, and to increase the redundancy for higher availability. While the description below and the Figures refer to a SMLT, the same concepts apply to MLT and LAG and the terms SMLT, MLT, LAG and MLT/LAG and SMLT/LAG are used interchangeably throughout the rest of the application.

SUMMARY

MLT/LAG (Multi Link Trunk/Link Aggregation Group) is a solution to two problems with Ethernet connections: bandwidth limitation and lack of redundancy. MLT/LAG provides a method to control the bundling of several physical ports together to form a single logical channel. Flow hashing is typically used to load balance the flows across the bundle. When a physical link or port member fails, the sender redistributes the flows across the remaining port members within the bundle. When the failed port through a recovery process eventually comes back online, the sender again distributes the flows across all ports within the bundle as it was prior to the failure. If this recovery process is not handled correctly, it will result in packet loss.

Conventional mechanisms such as those explained above suffer from a variety of deficiencies. One such deficiency is that in conventional link recovery for an MLT/LAG environment, there exists an amount of time when a node is detected as being recovered and that nodes ability to forward packets is not yet fully operational. This is due to the starting up of protocols, building of forwarding tables, and the like. Any packets sent to the recovered node during this time can be dropped.

Embodiments of the invention significantly overcome such deficiencies and provide mechanisms and techniques that provide a recovery method that is completely lossless. In a particular embodiment of a method for performing lossless link recovery between two devices interconnected by way of a MLT/LAG, the method includes maintaining two variables per port member of a network device which is part of a Split Multi Link Trunk/Link Aggregation Group (SMLT/LAG), a first variable comprising a link status variable reflecting a link status, and a second variable comprising a forwarding status variable reflecting a forwarding status of a forwarding plane with respect to the port, the link status variable and the forwarding status variable in a first state when the port is operating properly. The method further includes detecting a failure related to the port. Additionally the method includes setting the link status variable to a second state and setting the forwarding status variable to a second state. The method also includes detecting when the port becomes available and setting the forwarding status variable back to the first state. Additionally, the method includes transmitting a message to a peer network device and receiving a message from the peer device. Further, the method includes setting the link state variable back to the first state and resuming packet forwarding operations for the port.

Other embodiments include a computer readable medium having computer readable code thereon for providing performing lossless link recovery between two devices interconnected by way of a MLT/LAG. The computer readable medium includes instructions for maintaining two variables per port member of a network device which is part of a Split Multi Link Trunk/Link Aggregation Group (SMLT/LAG), a first variable comprising a link status variable reflecting a link status, and a second variable comprising a forwarding status variable reflecting a forwarding status of a forwarding plane with respect to the port, the link status variable and the forwarding status variable in a first state when the port is operating properly. The computer readable medium further includes instructions for detecting a failure related to the port. Additionally the computer readable medium includes instructions for setting the link status variable to a second state and setting the forwarding status variable to a second state. The computer readable medium also includes instructions for detecting when the port becomes available and setting the forwarding status variable back to the first state. Additionally, the computer readable medium includes instructions for transmitting a message to a peer network device and receiving a message from the peer device. Further, the computer readable medium includes instructions for setting the link state variable back to the first state and resuming packet forwarding operations for the port.

Still other embodiments include a computerized device (e.g. a network device), configured to process all the method operations disclosed herein as embodiments of the invention. In such embodiments, the computerized device includes a memory system, a processor, communications interface in an interconnection mechanism connecting these components. The memory system is encoded with a process that provides lossless link recovery as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing lossless link recovery as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured Avaya, Inc. of Lincroft, N.J.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Two or more links may be grouped to form a Multi-Link Trunk (MLT). Each MLT is assigned a MLT group ID (MLT-ID), which is a global value within the cluster and unique across the cluster nodes. An MLT with all its port members only on one node is referred to as a normal MLT group. An MLT group where its port members are on two or more nodes is referred to as a Split MLT or SMLT group.

When a logical port is implemented as a MLT or SMLT, there are actually multiple physical ports that are capable of forwarding a packet to its next hop on the network. Accordingly, if one of the ports of a MLT/SMLT fails, it would be advantageous to cause the packet to be forwarded on one of the remaining ports so that the packet can traverse the network rather than being dropped. Likewise, rather than designate a primary and backup port for each port in the MLT/SMLT, it would be advantageous to load share the packets across the remaining ports of the MLT/SMLT so that the packets may be distributed across the remaining ports that are UP. According to an embodiment, this process is implemented in hardware so that the fastpath (dataplane) can automatically accommodate individual and multiple port failures and automatically redirect packet traffic across the remaining ports in an equitable manner.

Figure 1A:
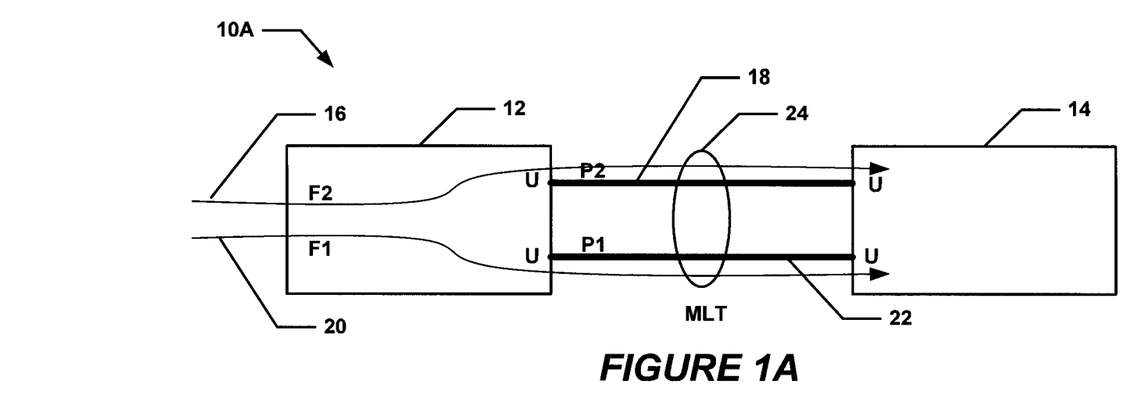
FIG. 1A is a block diagram showing an example split multilink trunk network in accordance with embodiments of the invention.

FIG. 1A shows two switch nodes 12 and 14 connected via a two-port member MLT/LAG (P1 and P2) 24. Flow F1 (20) is hashed to P1 (22), and flow F2 (16) is hashed to P2 (18). The link states of P1 and P2 on both nodes are UP (U). This is the normal mode of operation.

Figure 1B:
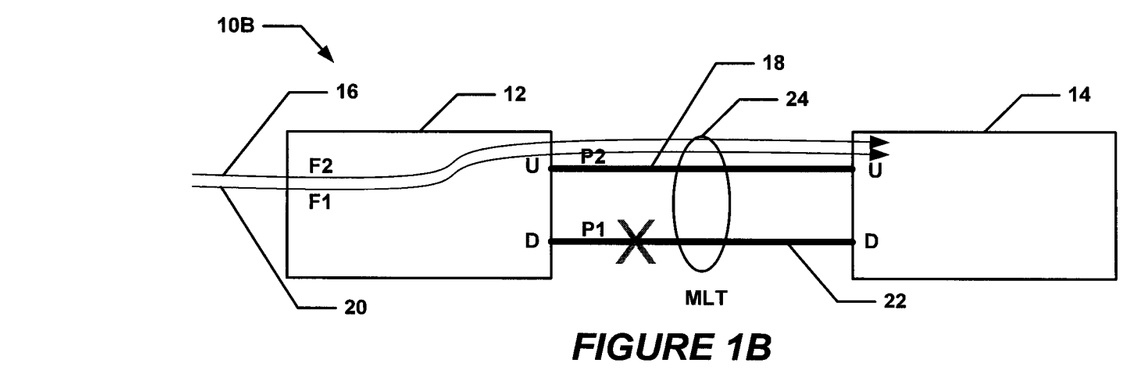
FIG. 1B is a block diagram showing an example split multilink trunk network in accordance with embodiments of the invention.

FIG. 1B shows what happens when a port failure occurs. Ports can fail for many reasons, including line card failure, failure of the link connected to the port (e.g. line cut), far-end line card failure, etc. Likewise, the internal forwarding datapath within the network element may fail which may cause a port or set of ports to appear to have failed, or there may be some other failures along the logical/virtual connection to the port's external peer endpoint. There are numerous reasons why a port may fail. Here, P1 fails which causes the link states of P1 on both nodes to transition from the UP (U) state to the Down (D) state. The failure causes flow F1 to be sent to P2. P2 now carries both flow F1 and flow F2.

Figure 1C:
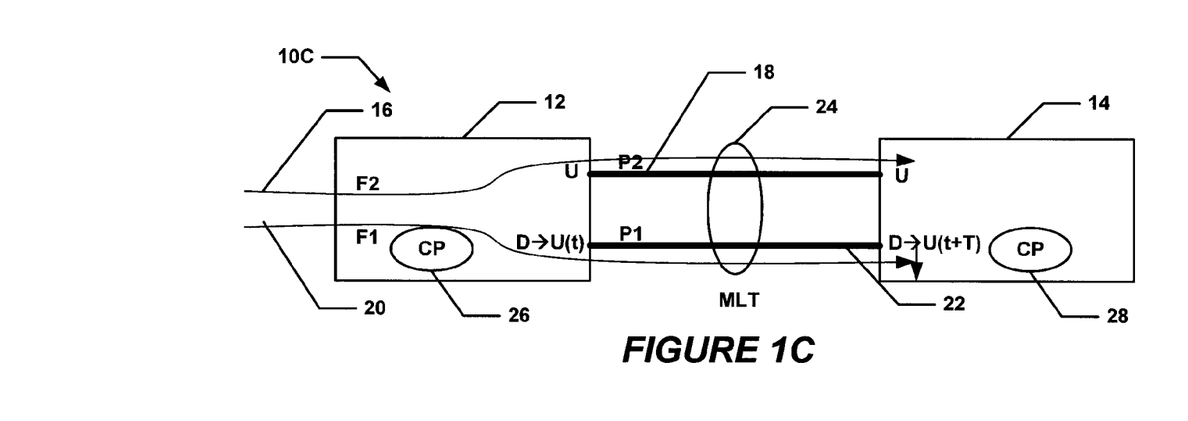
FIG. 1C is a block diagram showing an example split multilink trunk network in accordance with embodiments of the invention.

Referring now to FIG. 1C, a conventional link recovery process where each node's control plane (26 and 28 respectively) independently bring P1 back online. Since this operation is not synchronized between the two control planes, a time window exists where a sender starts sending packets while the other node is not ready yet. As shown, node 12 puts P1 in the UP State at U(t) and node 14 puts P1 in the UP state at U(t+T). The time window T is where up to few seconds of packet loss could occur.

The presently described recovery method is fully lossless, and can easily be implemented in both software and hardware. The system maintains two state variables per MLT/LAG port member; namely, a Link State and a Forwarding State. The Link State reflects the physical link status of a particular port and includes the following state values: UP and DOWN. The Forwarding State reflects the state of the forwarding plane with respect to this port and includes the following state values: READY and NOT_READY. The Link State always transitions from UP to DOWN state if the physical link goes down. The Link State can only transition from DOWN to UP state only if the control plane allows such transition. Typically, the control plane independently checks the physical link status and if it is up, it then causes the Link State transition to the UP State. The Link State of a port is used by the datapath for switch over operations. The Forwarding State of a port is also used by the control plane to indicate whether the datapath is ready to receive from and transmit to the associated port.

Figure 1D:
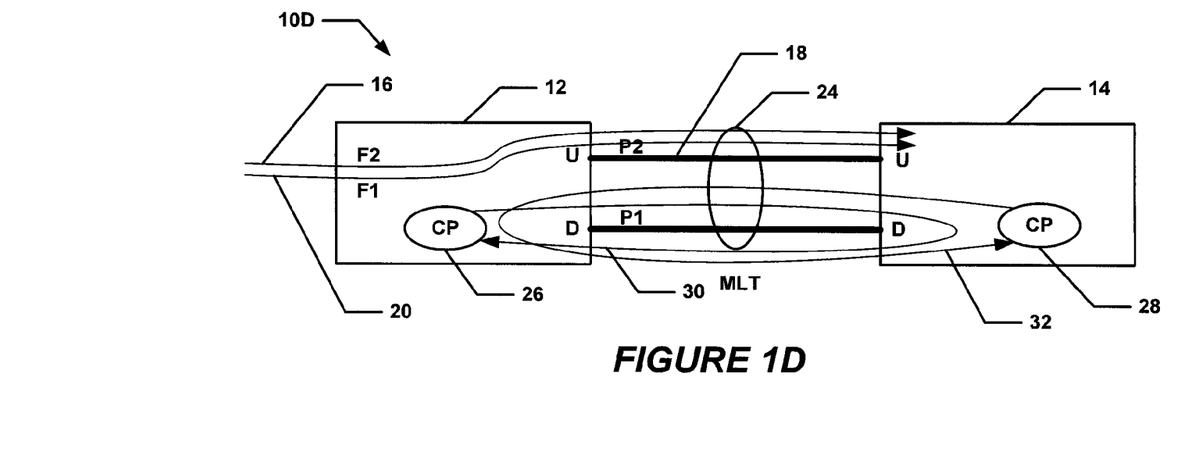
FIG. 1D is a block diagram showing an example split multilink trunk network in accordance with embodiments of the invention.

Referring now to FIG. 1D, a port failure is detected when the physical link status goes down which causes the Link State transition from UP to DOWN state. The control plane (26 and 28 respectively) detects the DOWN state and as a result it sets the Forwarding State for the corresponding port to the NOT_READY State. Typical control plane implementations perform certain housekeeping operations any time there is a link state transition. The result of such housekeeping operations sets the correct Forwarding State.

The control plane detects when the failed physical link comes back up. It uses this link status change to make its datapath ready for forwarding. After this process, the control plane 26 of peer node 12 sets the Forwarding State to READY while keeping the Link State in DOWN state, and starts periodically transmitting "I am ready" messages 30 to the other peer node 14. Meanwhile, the peer node 14 is independently is going through the same procedure. The control plane 28 of peer node 14 sets the Forwarding State to READY while keeping the Link State in DOWN state, and starts periodically transmitting "I am ready" messages 32 to the other peer node 12. The very first time each node 12 and 14 receives an "I am ready" message from its peer node on that port while its Forwarding State is UP, it forces the Link State to transition from DOWN to UP State given the physical link status is up, and stops transmitting "I am ready" message via this port to its peer node. This signals the datapath subsystem that the failed MLT port member is back online and all F2 flows can switch back to this port. Since both nodes Link States are in UP state and Forwarding States are in READY State, no packets are lost during the datapath switch over operation. Note that each node ignores any "I am ready" message while its associated port Forwarding State is in the NOT_READY State.

Figure 2:
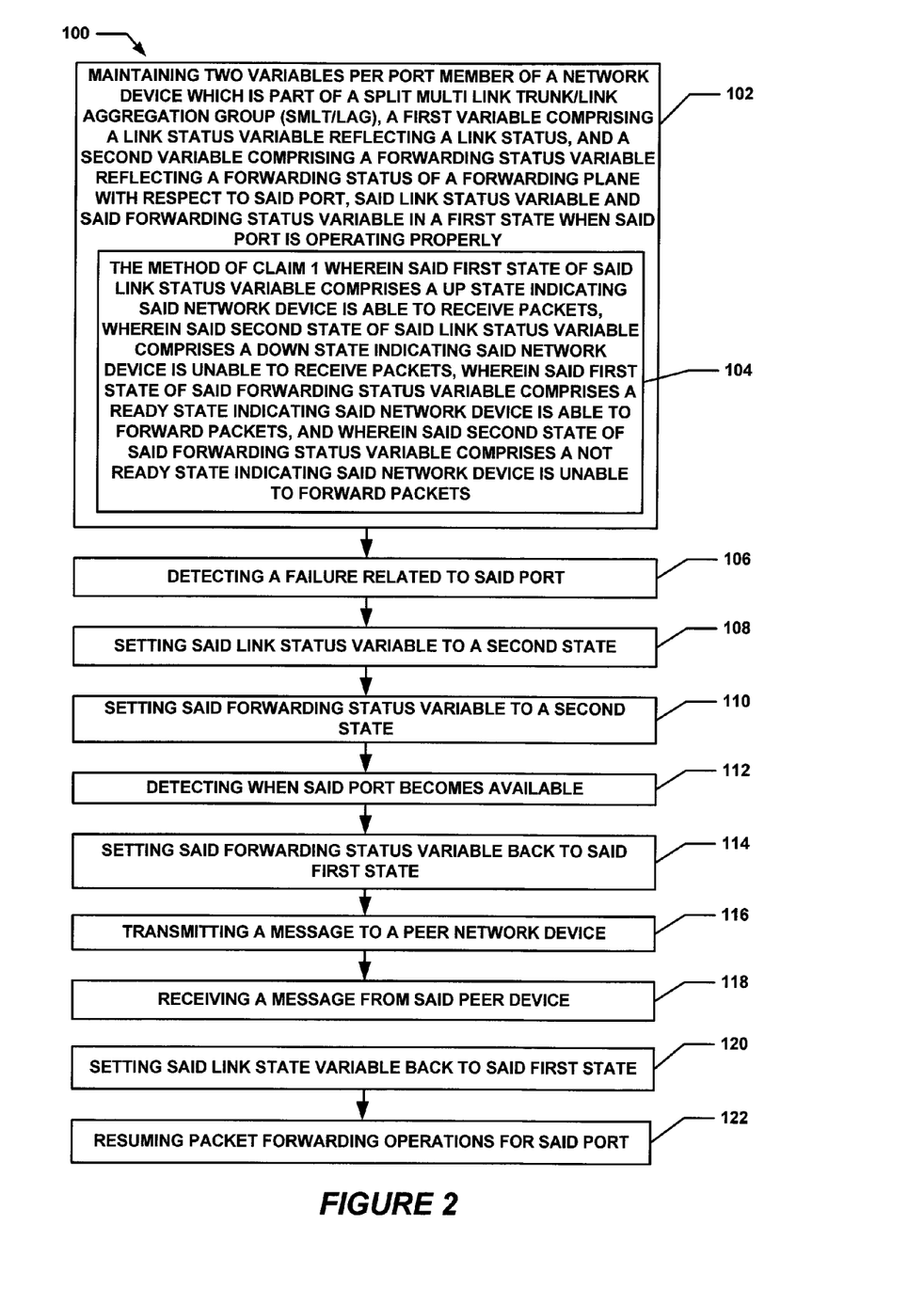
FIG. 2 comprises a flow diagram illustrating a particular embodiment of a method providing lossless link recovery in accordance with embodiments of the invention.

A flow chart of a particular embodiment of the presently disclosed method of performing lossless link recovery is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 of performing lossless link recovery is shown. Method 100 begins with processing block 102 which discloses maintaining two variables per port member of a network device which is part of a Split Multi Link Trunk/Link Aggregation Group (SMLT/LAG), a first variable comprising a link status variable reflecting a link status, and a second variable comprising a forwarding status variable reflecting a forwarding status of a forwarding plane with respect to the port, the link status variable and the forwarding status variable in a first state when the port is operating properly. As shown in processing block 104 the first state of the link status variable comprises a UP state indicating the network device is able to receive packets, the second state of the link status variable comprises a DOWN state indicating the network device is unable to receive packets, the first state of the forwarding status variable comprises a READY state indicating the network device is able to forward packets, and the second state of the forwarding status variable comprises a NOT READY state indicating the network device is unable to forward packets.

Processing block 106 states detecting a failure related to the port. Ports can fail for many reasons, including line card failure, failure of the link connected to the port (e.g. line cut), far-end line card failure, etc. Likewise, the internal forwarding datapath within the network element may fail which may cause a port or set of ports to appear to have failed, or there may be some other failures along the logical/virtual connection to the port's external peer endpoint. There are numerous reasons why a port may fail.

Processing block 108 recites setting the link status variable to a second state. Processing block 110 discloses setting the forwarding status variable to a second state.

Processing block 112 states detecting when the port becomes available. Processing block 114 discloses setting the forwarding status variable back to the first state.

Processing block 116 states transmitting a message to a peer network device. Processing block 118 recites receiving a message from the peer device.

Processing block 120 discloses setting the link state variable back to the first state. The Link State can only transition from DOWN to UP state only if the control plane allows such transition. Typically, the control plane independently checks the physical link status and if it is up, it then causes the Link State transition to the UP State. The Link State of a port is used by the datapath for switch over operations. The Forwarding State of a port is also used by the control plane to indicate whether the datapath is ready to receive from and transmit to the associated port.

Processing block 122 states resuming packet forwarding operations for the port. Since both nodes Link States are in UP state and Forwarding States are in READY State, no packets are lost during the datapath switch over operation.

Figure 3:
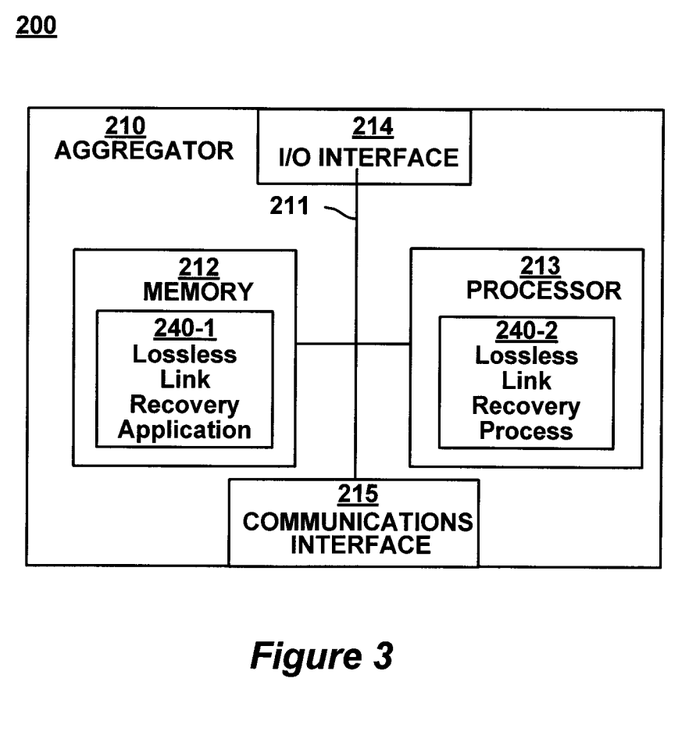
FIG. 3 illustrates an example computer system architecture for a network device that performs lossless link recovery in accordance with embodiments of the invention.

FIG. 3 is a block diagram illustrating example architecture of a computer system (e.g. an aggregator) 210 that executes, runs, interprets, operates or otherwise performs lossless link recovery application 240-1 and lossless link recovery process 240-2 suitable for use in explaining example configurations disclosed herein. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a lossless link recovery application 240-1 as explained herein. The lossless link recovery application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a lossless link recovery application 240-1. Execution of a lossless link recovery application 240-1 in this manner produces processing functionality in the lossless link recovery process 240-2. In other words, the lossless link recovery process 240-2 represents one or more portions or runtime instances of a lossless link recovery application 240-1 (or the entire a lossless link recovery application 240-1) performing or executing within or upon the processor 213 in the computerized device 210 at runtime.

It is noted that example configurations disclosed herein include the lossless link recovery application 240-1 itself (i.e., in the form of un-executed or non-performing logic instructions and/or data). The lossless link recovery application 240-1 may be stored on a computer readable medium (such as a floppy disk), hard disk, electronic, magnetic, optical, or other computer readable medium. A lossless link recovery application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a lossless link recovery application 240-1 in the processor 213 as the lossless link recovery process 240-2. Those skilled in the art will understand that the computer system 210 may include other processes and/or software and hardware components, such as an operating system not shown in this example.

During operation, processor 213 of computer system 200 accesses memory system 212 via the interconnect 211 in order to launch, run, execute, interpret or otherwise perform the logic instructions of the lossless link recovery application 240-1. Execution of lossless link recovery application 240-1 produces processing functionality in lossless link recovery process 240-2. In other words, the lossless link recovery process 240-2 represents one or more portions of the lossless link recovery application 240-1 (or the entire application) performing within or upon the processor 213 in the computer system 200.

It should be noted that, in addition to the lossless link recovery process 240-2, embodiments herein include the lossless link recovery application 240-1 itself (i.e., the un-executed or non-performing logic instructions and/or data). The lossless link recovery application 240-1 can be stored on a computer readable medium such as a floppy disk, hard disk, or optical medium. The lossless link recovery application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of lossless link recovery application 240-1 in processor 213 as the lossless link recovery process 240-2. Those skilled in the art will understand that the computer system 200 can include other processes and/or software and hardware components, such as an operating system that controls allocation and use of hardware resources associated with the computer system 200.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims.

What is claimed is:

1. A computer implemented method comprising:
maintaining two variables per port member of a network device which is part of a Split Multi Link Trunk/Link Aggregation Group (SMLT/LAG), a first variable comprising a link status variable reflecting a link status, and a second variable comprising a forwarding status variable reflecting a forwarding status of a forwarding plane with respect to said port, said link status variable and said forwarding status variable in a first state when said port is operating properly;
detecting a failure related to said port;
setting said link status variable to a second state; and
setting said forwarding status variable to a second state, and wherein said first state of said link status variable comprises a UP state indicating said network device is able to receive packets, wherein said second state of said link status variable comprises a DOWN state indicating said network device is unable to receive packets, wherein said first state of said forwarding status variable comprises a READY state indicating said network device is able to forward packets, and wherein said second state of said forwarding status variable comprises a NOT READY state indicating said network device is unable to forward packets.

2. The method of claim 1 further comprising detecting when said port becomes available.

3. The method of claim 2 further comprising setting said forwarding status variable back to said first state.

4. The method of claim 3 further comprising transmitting a message to a peer network device.

5. The method of claim 4 further comprising receiving a message from said peer device.

6. The method of claim 5 further comprising setting said link state variable back to said first state.

7. The method of claim 6 further comprising resuming packet forwarding operations for said port.

8. A non-transitory computer readable storage medium having computer readable code thereon for routed split multilink trunking for lossless link recovery, the medium including instructions in which a computer system performs operations comprising:
maintaining two variables per port member of a network device which is part of a Split Multi Link Trunk/Link Aggregation Group (SMLT/LAG), a first variable comprising a link status variable reflecting a link status, and a second variable comprising a forwarding status variable reflecting a forwarding status of a forwarding plane with respect to said port, said link status variable and said forwarding status variable in a first state when said port is operating properly;
detecting a failure related to said port;
setting said link status variable to a second state; and
setting said forwarding status variable to a second state, and wherein said first state of said link status variable comprises a UP state indicating said network device is able to receive packets, wherein said second state of said link status variable comprises a DOWN state indicating said network device is unable to receive packets, wherein said first state of said forwarding status variable comprises a READY state indicating said network device is able to forward packets, and wherein said second state of said forwarding status variable comprises a NOT READY state indicating said network device is unable to forward packets.

9. The computer readable storage medium of claim 8 further comprising instructions for detecting when said port becomes available.

10. The computer readable storage medium of claim 9 further comprising instructions for setting said forwarding status variable back to said first state.

11. The computer readable storage medium of claim 10 further comprising instructions for transmitting a message to a peer network device.

12. The computer readable storage medium of claim 11 further comprising instructions for receiving a message from said peer device.

13. The computer readable storage medium of claim 12 further comprising instructions for setting said link state variable back to said first state.

14. The computer readable storage medium of claim 13 further comprising instructions for resuming packet forwarding operations for said port.

15. A network device comprising:
a memory;
a processor;
a communications interface;
an interconnection mechanism coupling the memory, the processor and the communications interface; and
wherein the memory is encoded with an application providing lossless link recovery, that when performed on the processor, provides a process for processing information, the process causing the first aggregation device to perform the operations of:
maintaining two variables per port member of a network device which is part of a Split Multi Link Trunk/Link Aggregation Group (SMLT/LAG), a first variable comprising a link status variable reflecting a link status, and a second variable comprising a forwarding status variable reflecting a forwarding status of a forwarding plane with respect to said port, said link status variable and said forwarding status variable in a first state when said port is operating properly;
detecting a failure related to said port;
setting said link status variable to a second state; and setting said forwarding status variable to a second state, and wherein said first state of said link status variable comprises a UP state indicating said network device is able to receive packets, wherein said second state of said link status variable comprises a DOWN state indicating said network device is unable to receive packets, wherein said first state of said forwarding status variable comprises a READY state indicating said network device is able to forward packets, and wherein said second state of said forwarding status variable comprises a NOT READY state indicating said network device is unable to forward packets.

16. The network device of claim 15 further comprising detecting when said port becomes available and setting said forwarding status variable back to said first state.

17. The network device of claim 16 further comprising transmitting a message to a peer network device; receiving a message from said peer device, setting said link state variable back to said first state, and resuming packet forwarding operations for said port.

18. The method of claim 1 wherein said link state status variable transitions from said DOWN state to said UP state only if a control plane of said network device allows such a transition.

19. The computer readable medium of claim 8 wherein said link state status variable transitions from said DOWN state to said UP state only if a control plane of said network device allows such a transition.

20. The network device of claim 15 wherein said link state status variable transitions from said DOWN state to said UP state only if a control plane of said network device allows such a transition.

* * * * *